Aug. 22, 1950   R. W. LEE ET AL   2,519,773
ANTENNA TRACKING SYSTEM
Filed July 18, 1944
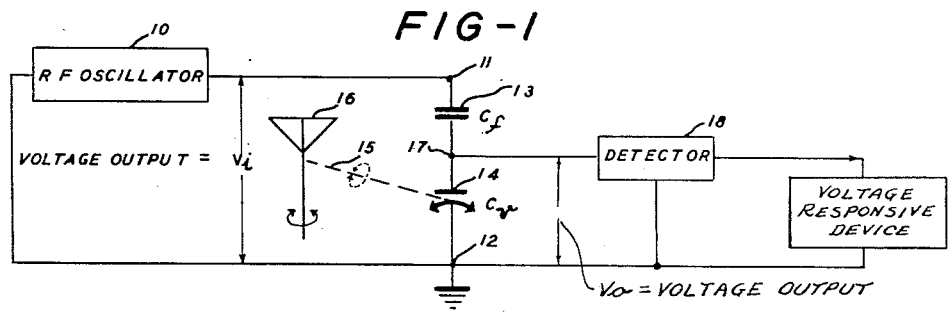
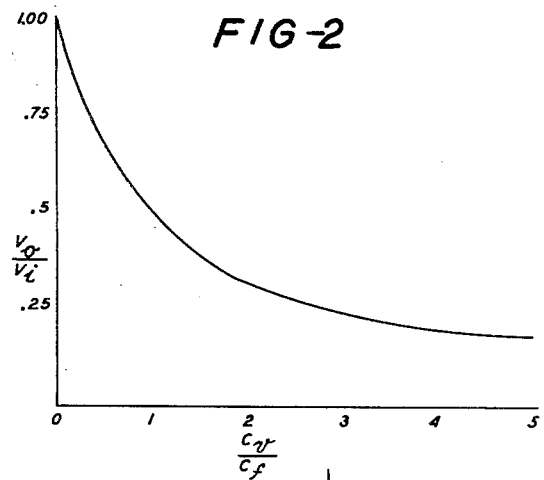
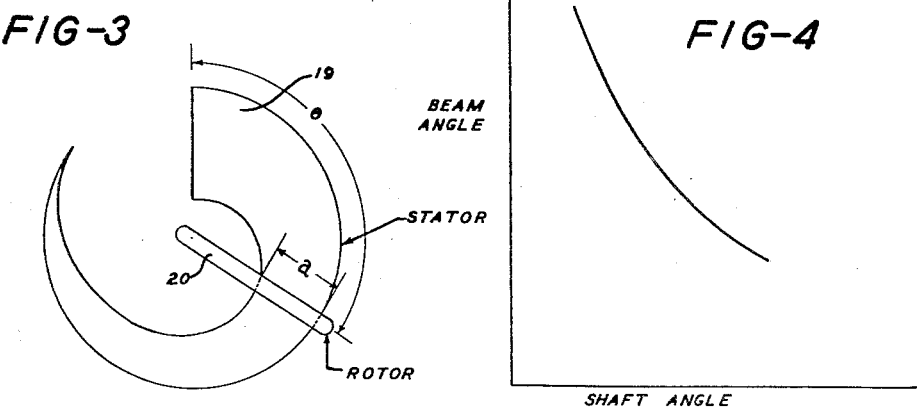
INVENTORS
EUGENE A. HOLMES & RICHARD W. LEE
BY
William D. Hall.
ATTY.

Patented Aug. 22, 1950

2,519,773

UNITED STATES PATENT OFFICE 2,519,773

ANTENNA TRACKING SYSTEM

Richard W. Lee, Watertown, and Eugene A. Holmes, Boston, Mass., assignors, by mesne assignments, to the United States of America as represented by the Secretary of War Application July 18, 1944, Serial No. 545,492

5 Claims. (Cl. 177—351)

The present invention relates to communication systems, and it relates more particularly to systems wherein electrical data concerning the angular rotation of a shaft is generated in the form of a variable voltage, the voltage being the function of the shaft rotation.

Heretofore rotationally-produced voltage variations were obtained from potentiometer devices, from "Selsyn," "Autosyn," synchro devices, or the like. These devices, however, are limited in their operation by certain inherent disadvantages such as the speed at which they may be rotated, contact wear, the relatively substantial driving torques that are occasionally required, the introduction of harmonics of the modulation frequency into the carrier frequency, and in the case of "Selsyn" or like devices by the fact that the modulation frequency must be small compared to the carrier frequency, which is limited by the inductance of the system, and the further fact that the voltage output is limited to a sinusoidal function of shaft rotation.

An object of the present invention is to provide means for converting the angular rotational movement of a shaft into electrical data in the form of a variable voltage which obviates the foregoing and other disadvantages.

Another object of the present invention is to provide a data transmission system having means for generating a voltage that is a given function of shaft rotation, which function initially may be readily determined as a linear, hyperbolic, sinusoidal or any other desired function or combination of functions.

With the above and other objects in view, which will appear more fully from the following detailed description, accompanying drawings and appended claims, the present invention in its broader aspects may comprise a data transmission system for transmitting electrical data concerning the angular rotational movement of a shaft in the form of a variable voltage, said voltage being obtained through a capacitance voltage divider arrangement including a relatively fixed condenser element and a variable condenser element connected in series therewith, said variable condenser element being rotationally coupled to said shaft so that the voltage across said variable condenser element will be a given function of the shaft rotation, the specific function being dependent upon the shape of the plates of the variable condenser element.

Referring now to the drawings, wherein like reference characters indicate like parts:

Fig. 1 is a circuit diagram, partly schematic and partly in block form, of one illustrative embodiment of the present invention;

Fig. 2 is a graph showing how the voltage output of the capacitance voltage divider of the embodiment illustrated in Fig. 1 varies non-linearly with change in capacitance of the variable condenser element.

Fig. 3 represents a plan view of a specimen variable condenser having specially-shaped plates designed, when used in the circuit of Fig. 1, to provide an output voltage which is a linear function of shaft rotation; and Fig. 4 is a graph showing a specimen hyperbolic relation of two variables, as for example the beam angle of a directive transmitting antenna versus the angular position of the shaft element producing variation in said beam angle, which hyperbolic relation may be reproduced in terms of output voltage variation versus condenser shaft angle through the use of a standard variable condenser, whose capacitance is a linear function of its shaft rotation, as the capacitance element in the circuit of Fig. 1.

In the particular embodiment of the present invention illustrated in Fig. 1, a relatively steady source of A. C. voltage such as may be obtained from a radio frequency oscillator, indicated symbolically by block 10, is applied to input terminals 11 and 12 of a capacitance voltage divider arrangement, which may comprise a relatively fixed condenser 13 and a continuously rotatable variable condenser 14 connected in series therewith. A voltage divider arrangement is used in the present invention in order to derive across each condenser, from the relatively constant radio-frequency voltage $V_1$ of the oscillator, a voltage that will vary in accordance with the position of condenser 14. A single condenser across oscillator 10 would not serve to modulate $V_1$ and might overload the oscillator. Terminal 12 may be grounded as may also be the corresponding side of the R. F. oscillator 10. The variable condenser 14 is rotationally coupled through shaft element 15 to any desired rotatable data-determining driving element, as for example the illustrated directional antenna 16, or the like. The carrier output of oscillator 10, which is preferably of the order of megacycles, is thus modulated by the rotatable condenser 14 in conformance with the rotational movements of the data-determining element 16 to provide an output voltage $V_o$ that is a given function of the rotation of shaft element 15.

The voltage output of the capacitance voltage divider arrangement, which may be taken across the variable condenser element terminals 12 and 17 may be demodulated or rectified by any suitable detector means, as indicated by block 18, and then applied to the desired data receiving element, not shown, which may comprise an indicator, an oscilloscope, or the like.

In the hereinabove described data transmission system, the relationship of voltage output, $V_o$, to variable condenser capacitance, $C_v$, is inherently non-linear, due to the voltage divider characteristic. Thus, the voltage output of the capacity divider arrangement may be written as follows:

(1) $$V_o = \frac{X_v}{X_f + X_v} V_i$$

and (2) $$V_o = \frac{C_f}{C_f + C_v} V_i$$

where $V_o$ = Voltage output of the capacity divider
$V_i$ = Voltage input to the capacity divider
$X_f$ = Reactance of fixed condenser 13
$X_v$ = Reactance of variable condenser 14
$C_f$ = Capacitance of fixed condenser 13
$C_v$ = Capacitance of variable condenser 14

A plot of $$\frac{V_o}{V_i}$$

versus $$\frac{C_v}{C_f}$$

is shown in Fig. 2. Thus, from this graph and from Equation 2 above, it will be seen that the voltage output $V_o$ is inherently a non-linear function of the variable capacitance $C_v$.

If it is desired that the voltage output $V_o$ be a linear function of shaft rotation (which controls $C_v$), a compensating non-linearity can be introduced to provide the resultant desired linear relationship. Thus, this may be readily accomplished in the system of the present invention by a correct compensatory shaping of the plates of the variable condenser 14. Referring back to Equation 2, for unit input voltage $V_i=1$ and solving for the capacitance of the variable condenser $C_v$, we get:

(3) $$C_v = C_f \frac{1 - V_o}{V_o}$$

Now, for the voltage output to be a linear function of shaft rotation, i. e. for $V_o = f(\theta)$, where $\theta$ = the angle of shaft rotation, the variable condenser should be constructed so that its capacitance (from Equation 3) will be:

$$C_v = C_f \frac{1 - f(\theta)}{f(\theta)}$$

A variable condenser 14 having its plates specially shaped to meet the the above requirement is illustrated in Fig. 3. Specially curved condenser plate 19 may constitute the stator, and the partially overlapping condenser plate 20 may constitute the rotor. Stator plate 19 is specially shaped in such manner that the area of the overlap zone which is directly proportional to the "a" dimension at any angle $\theta$, is proportional to $$\frac{1 - f(\theta)}{f(\theta)}$$

where $f(\theta)$ represents the voltage output required per unit of radio frequency oscillator voltage for any shaft position $\theta$.

In cases where the voltage output is a linear function of shaft rotation, the function periodically returns to zero or some base voltage since it is not necessary to go to infinite values. These instances in which the function returns to zero or the base voltage may be referred to as discontinuities in the function, and by properly gearing the condenser rotor to the rotatable shaft of the data-determining element, these function discontinuities may be made to occur once per condenser rotation, coincident with the condenser discontinuities. For continuous functions such as sinusoidal functions, the question of condenser discontinuities does not arise.

In some instances, the angular movement of the rotatable shaft element which is rotatably coupled to the variable condenser may not vary linearly with the variable factor of the data-determining element with which it is associated, but may instead vary as a hyperbolic function thereof. Such a relationship has been graphically illustrated in Fig. 4, wherein the "beam angle" of a directive transmitting antenna is plotted along the Y-axis and the "shaft angle" is plotted along the X-axis. It will be noted that this function is hyperbolic, very closely resembling the curve of Fig. 2 where the non-linearity is due to the inherent characteristic of the capacitance voltage divider arrangement. In such case, the variable condenser element 14 of the circuit of Fig. 1 may be a standard variable condenser whose capacitance varies linearly with its shaft rotation, so that the voltage output constituting the transmitted electrical data may vary hyperbolically with shaft rotation; the requisite non-linearity being supplied by the inherent characteristic of the capacitance voltage divider arrangement.

By means of the present invention, the disadvantages inherent in prior art devices such as potentiometers, "Selsyn" or synchro devices, or the like are obviated. Thus, with the present invention, there is no rubbing of contacts, there is practically no wear, high rotational speeds are possible, and the driving torque required is negligible. Furthermore, a smooth variation in voltage output is achieved owing to the smooth change in capacitance with rotation of the condenser shaft, and harmonics of the modulation frequency are not introduced into the carrier, as is often the case in conventional data transmission systems. Furthermore, with the present invention, it is a relatively simple matter to vary the relationship between data-determining shaft rotation and voltage output, since this can be readily accomplished by merely changing the shape of the condenser plates.

What is claimed is:

1. In a radar system, a continuously rotating antenna; a high frequency oscillator adapted to generate a signal at a carrier frequency; a capacitance voltage divider network including a variable and a fixed condenser in series, said variable condenser being rotatably coupled to said antenna; means for applying said generated signal across said voltage divider network thereby modulating said signal in accordance with the angular position of said antenna; and demodulating means for removing said carrier-frequency component, coupled to said voltage divider network.

2. In radar apparatus, a system for transmitting information in the form of a variable voltage proportional to the movement of a scanning element, including a continuously rotating antenna; a source of high frequency electrical energy; a capacitance voltage divider network connected to said source, said network comprising a variable condenser connected to said rotating antenna and a fixed condenser in series with said variable condenser, whereby a voltage will be produced across each of said condensers, each of said voltages being a function of the instantaneous position of said rotating antenna; and demodulator means connected across one of said condensers to derive said variable voltage.

3. In a radio system, a continuously rotating antenna; a circuit for generating a voltage output that is any given function of the rotation of said antenna, said circuit including a high-frequency oscillator, a pair of series connected condensers coupled to and fed by said oscillator, one of said condensers having a rotor and a stator, whereby its capacitance may be varied, said rotor being rotationally coupled to said antenna, the voltage output being taken across the terminals of one of said condensers, the relationship between antenna rotation and voltage output being determined by the shape of the plates of said variable condenser; and demodulating means for removing said high frequency component, connected across one of said condensers; and indicator means coupled to the output of said demodulating means.

4. A circuit as set forth in claim 3, wherein the rotor and stator of said variable capacitor are so shaped that there is a linear relationship between the rotation of said antenna and said output voltage.

5. A circuit as set forth in claim 4, wherein said voltage output is taken across the terminals of said variable condenser.

RICHARD W. LEE.
EUGENE A. HOLMES.

REFERENCES CITED

The following references are of record in the file of this patent:

UNITED STATES PATENTS

| Number | Name | Date |
|---|---|---|
| 1,589,925 | Batcher | June 22, 1926 |
| 1,633,870 | Potter | June 28, 1927 |
| 1,705,734 | Pacent | Mar. 19, 1929 |
| 1,809,683 | FitzGerald | June 9, 1931 |
| 1,904,165 | Mullner | Apr. 18, 1933 |
| 1,918,238 | Andrews | July 18, 1933 |
| 1,970,442 | Wittkuhns | Aug. 14, 1934 |
| 2,036,833 | Schmidt | Apr. 7, 1936 |
| 2,052,385 | Dallmann | Aug. 25, 1936 |
| 2,178,471 | De Bruin | Oct. 31, 1939 |
| 2,205,866 | Schweitzer | June 25, 1940 |
| 2,255,502 | Bousman | Sept. 9, 1941 |
| 2,288,838 | Pike | July 7, 1942 |
| 2,303,214 | Labin | Nov. 24, 1942 |
| 2,404,238 | Loughlin | July 16, 1946 |

FOREIGN PATENTS

| Number | Country | Date |
|---|---|---|
| 335,618 | Great Britain | Sept. 29, 1930 |

OTHER REFERENCES

Ser. No. 387,780, Dijksterhuis (A. P. C.), published May 18, 1943.